July 3, 1956    P. RUDIO    2,752,838
EARTH LOOSENING MACHINE
Filed July 26, 1954    3 Sheets-Sheet 1
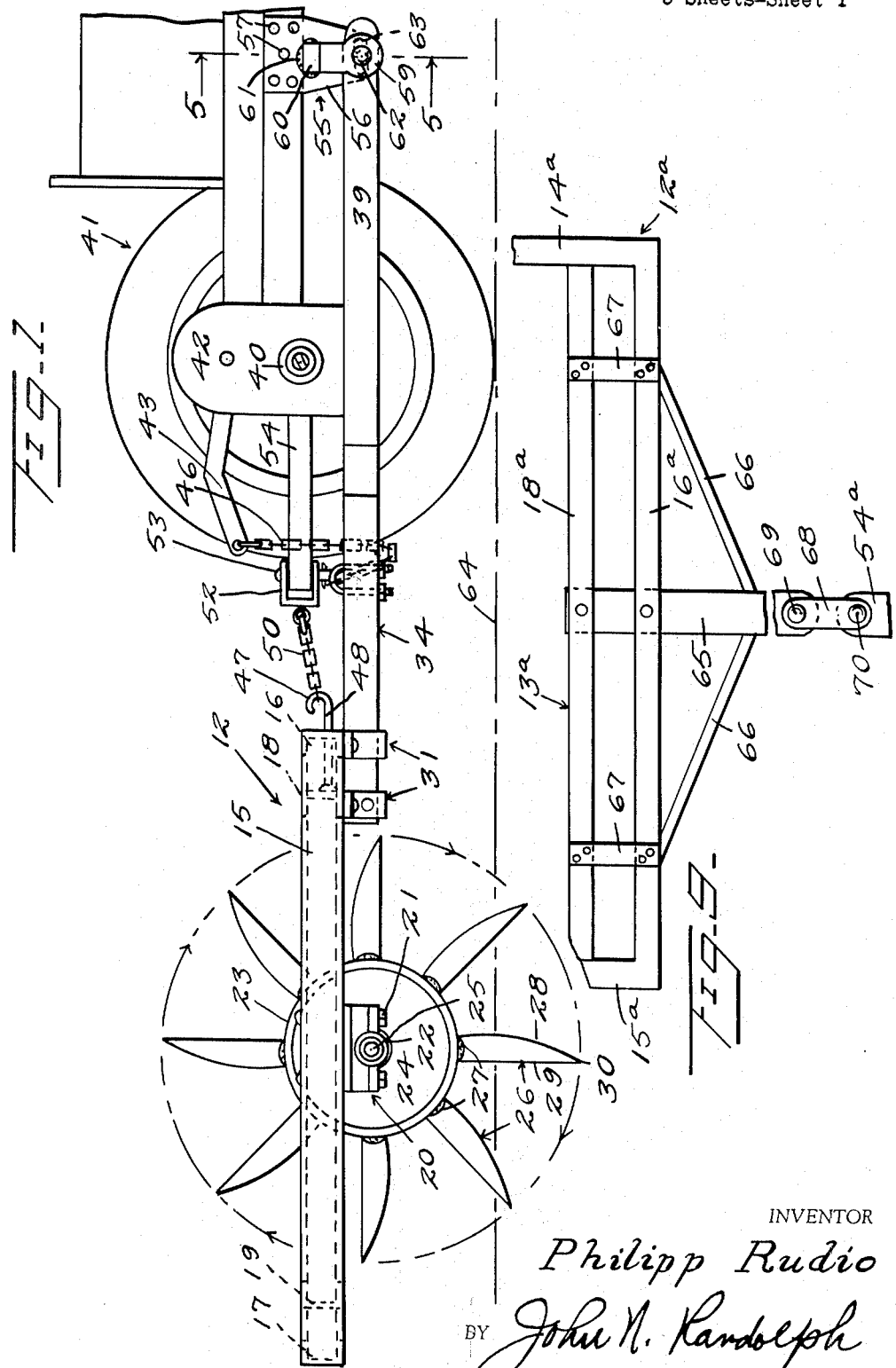
INVENTOR
Philipp Rudio
BY John N. Randolph
ATTORNEY

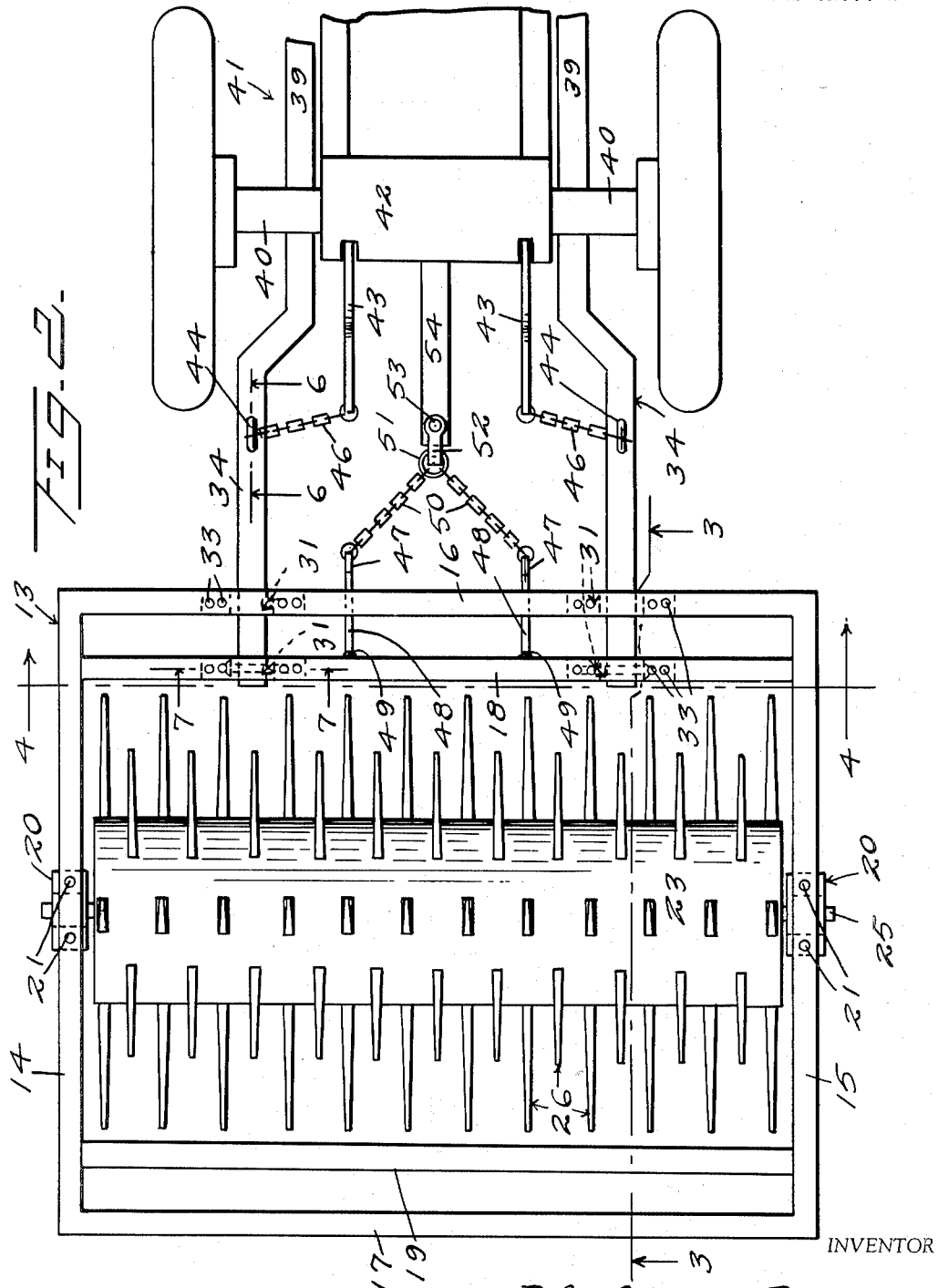

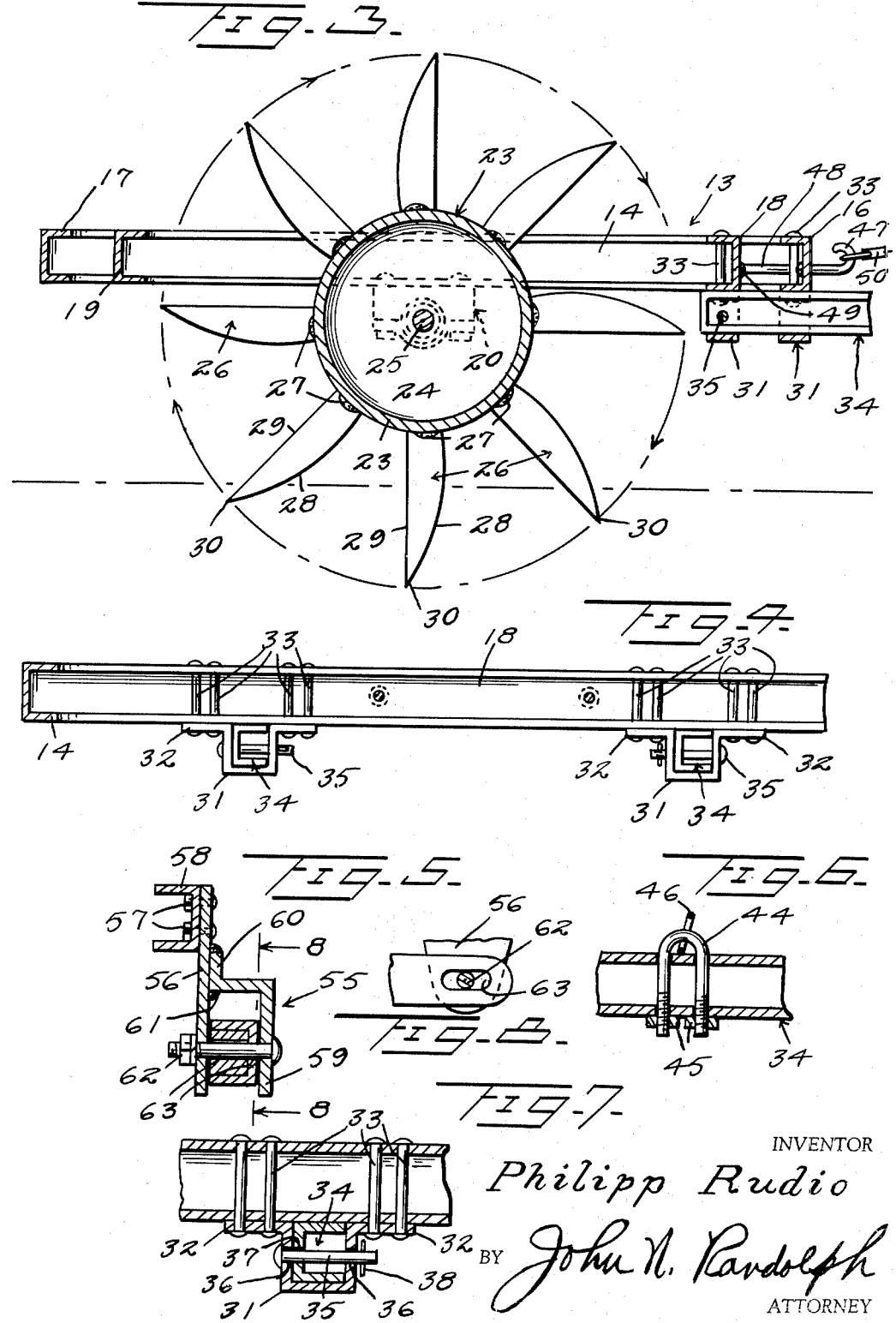

United States Patent Office 2,752,838
Patented July 3, 1956

2,752,838

EARTH LOOSENING MACHINE

Philipp Rudio, Billings, Mont.

Application July 26, 1954, Serial No. 445,527

1 Claim. (Cl. 97—47.51)

This invention relates to a trailer type machine of extremely simple construction adapted to be drawn by a tractor, and including a plurality of rotatably carried earth penetrating tines designed to readily enter the ground to a substantial depth, for effectively loosening the earth on the surface and substantially below the surface, and by means of which the earth is effectively loosened in all directions around the tines, due to the shape of the tines and their rocking movement while in subsurface positions.

A further object of the invention is to provide an earth loosening machine or apparatus capable of being flexibly connected to a tractor for varying the depth to which the tines will penetrate the earth and which may be readily weighted to any desired extent to increase the depth of penetration of the tines.

Still another object of the invention is to provide a machine including a tine supporting drum capable of additionally functioning as a roller to crush lumps of earth on top of the ground and to compress the lumps whereby the tines can efficiently break up and loosen the lumpy earth.

Another object of the invention is to provide a machine capable of being used to great advantage on ground over which manure has been spread for loosening the manure covered earth and for carrying the manure from the surface thereof downwardly into the ground to thoroughly mix the manure with the loosened soil to form a seed bed properly loosened for planting.

Another object of the invention is to provide a machine which may be readily operated on hillsides including pasture land for loosening the earth so that rain water will readily penetrate the ground instead of passing off as surface drainage as frequently occurs where the ground is relatively hard.

Still another object of the invention is to provide a machine which will effectively loosen and condition the ground for the sowing of fertilizer therein so as to insure penetration of the fertilizer into the ground.

Still another object of the invention is to provide a machine which due to the unique construction of the tines will maintain itself clean at all times even where the tines are operating in damp ground.

Various other objects and advantages of the invention will hereinafter become more fully apparent from the following description of the drawings, illustrating presently preferred embodiments thereof, and wherein:

Figure 1 is a side elevational view of a preferred form of the earth loosening machine shown coupled to a conventional tractor and disposed to be drawn therebehind;

Figure 2 is a top plan view thereof;

Figure 3 is an enlarged fragmentary longitudinal sectional view taken substantially along a plane as indicated by the line 3—3 of Figure 2;

Figure 4 is an enlarged fragmentary cross sectional view, taken substantially along a plane as indicated by the line 4—4 of Figure 2;

Figure 5 is an enlarged fragmentary cross sectional view taken substantially along a plane as indicated by the line 5—5 of Figure 1;

Figure 6 is an enlarged fragmentary longitudinal sectional view, taken substantially along a plane as indicated by the line 6—6 of Figure 2;

Figure 7 is an enlarged fragmentary cross sectional view taken substantially along a plane as indicated by the line 7—7 of Figure 2;

Figure 8 is a fragmentary sectional view, taken substantially along a plane as indicated by the line 8—8 of Figure 5, and on a reduced scale, and Figure 9 is a fragmentary plan view of the forward end of the frame, illustrating a slightly modified form of the machine.

Referring more specifically to the drawings, Figures 1 to 8, the earth loosening machine in its entirety as disclosed therein is designated generally 12 and includes a relatively heavy rigid frame, designated generally 13, including corresponding substantially parallel sides 14 and 15, a front portion 16 and a rear portion 17. The frame 13 also includes a rigid cross brace 18 which extends between and is secured at its ends to the sides 14 and 15 and which is disposed adjacent and substantially parallel to the front portion 16. The frame is also provided with a similar rear brace 19 located forwardly of and adjacent the rear frame member 17. The rigid frame members 14 to 19, inclusive, may be formed of channel iron, as illustrated, or may be of angle iron. Transversely aligned bearings 20 are secured by suitable fastenings 21 to the undersides of the side members 14 and 15 and substantially intermediate of the ends thereof. Each of the bearings 20 includes a detachable bottom section 22 defining one half of the journal portion thereof.

A drum 23 of relatively large diameter and of circular cross section is provided with end walls 24. An axle 25 extends centrally through the drum 23 and has portions thereof secured in the end walls 24. The ends of the axle 25 project beyond the drum ends 24 and are journaled in the bearings 20 for rotatably supporting the drum 23 within the frame 13 and between the side members 14 and 15 thereof. As seen in Figure 2, the length of the drum 23 is somewhat less than the spacing between the side members 14 and 15.

A plurality of tines or earth penetrating elements 26 have inner ends which are secured to the outer side of the drum 23, in any suitable manner as by welding, as seen at 27 in Figure 1. The tines 26 project radially from the periphery of the drum 23 and are disposed in longitudinal rows, as seen in Figure 2, the individual tines of each row of which are staggered relatively to the tines of the rows on either side thereof. The tines 26 are of considerable length and considerable width and the trailing edges 28 thereof are curved from substantially intermediate of the ends of the tines toward the leading edges 29 and merge at their outer ends with said trailing edges to provide points 30 at the outer ends of the tines. The tines 26 are relatively thick, as seen in Figure 2, at their inner ends and taper in thickness on both sides thereof from their inner ends to their pointed outer ends 30.

A pair of U-shaped members 31 are disposed beneath and secured to each of the frame members 16 and 18 at points near to and spaced equal distances from the end frame members 14 and 15. Each of said U-shaped members 31 is provided with outturned flanges 32 which bear against the underside of either the frame member 16 or 18 and which are secured thereto by fastenings 33. The rear ends of a pair of elongated beams 34 engage in the aligned U-shaped members 31 of the frame parts 16 and 18 and are secured to the frame 13 by headed pins 35 which extend through aligned openings 37 of the beams and 36 of the members 31, which are secured to the frame part 18. Each pin 35 has a cotter pin 38 or the like secured therein for retaining the pins in engagement with the openings 36 and 37 of the members 31 and 34, as best seen in Figure 7. The beams 34 extend forwardly from the frame 13 and have inwardly offset substantially parallel forward end portions 39 which extend forwardly beneath the rear axle housing 40 of a conventional tractor, a rear part of which is illustrated in the drawings and designated generally 41. The beam portions 39 loosely straddle the housing 42 of a conventional hydraulic lift of the tractor 41 and which is provided with rearwardly extending vertically swingable lift arms 43. The beams 34 are provided with upstanding loop portions 44, which may be formed by the bight portions of U-bolts, as seen in Figure 6, which extend vertically therethrough and which are secured thereto by nuts 45 which engage the threaded ends of said U-bolts. The beams 34 are connected to the rear free ends of the lift arms 43 by chains or other suitable flexible members 46 having corresponding ends connected to the arms 43 and opposite ends connected to the loop members or U-bolts 44.

A pair of rearwardly opening hook members 47 extend forwardly from the front frame part 16 and are equally spaced from the center of said frame part 16 and on opposite sides of the center thereof. The rearwardly opening hook members 47 have elongated shanks 48 which extend through the frame parts 16 and 18 and which are secured to the frame in any suitable manner as by being welded to the frame part 18, as indicated at 49 in Figures 2, 3 and 4. Corresponding ends of a pair of chains 50 are attached to the hooks 47 and extend forwardly therefrom in converging relation to one another and are connected at their opposite ends to a ring 51 which engages a clevis 52. The clevis 52 is swingably connected by a coupling pin or the like 53 to the rear end portion of the drawbar 54 of the tractor 41, for swinging movement of the clevis horizontally.

The forward ends of the beam portions 39 are connected to the tractor 41 by brackets 55 each including a hanger plate 56. The upper ends of the hanger plates 56 are secured by fastenings 57 to the outer sides of the two longitudinally extending frame members 58 of the tractor chassis. Each bracket 55 includes a plate 59 which is outwardly offset relatively to the lower portion of the hanger plate 56 and which has an inwardly offset upper end 60 which is secured, as by welding 61, to a portion of the plate 56 which is spaced from the lower end thereof. The forward ends of the beam portions 39 loosely fit in the brackets 55 between the lower portions of the hanger plates 56 and the plates 59 and are connected thereto by suitable fastenings 62, such as nut and bolt fastenings, which extend through aligned openings in the parts 56 and 59 and which loosely engage longitudinally elongated openings 63 in the beam portions 39. The openings 63 permit a vertical rocking movement of the beams 34 relatively to the brackets 55 and also a limited longitudinal movement of said beams relatively to the brackets, as best illustrated in Figure 8.

From the foregoing it will be readily apparent that the arms 43 of the hydraulic lift 42 may be elevated in a conventional manner to exert an upward pull on the chains 46 for swinging the beams 34 upwardly about their pivots 62, for elevating the rear ends of said beams and the frame 13 sufficiently so that all of the tines 26 will be disposed above the ground level, designated 64 in Figure 1. The earth loosening machine 12 thus raised to a transporting position, may be readily transported by the tractor 41 or may be readily turned around in a confined space. When the machine 12 is to be utilized, the hydraulic lift 42 is actuated to lower the arms 43 sufficiently to provide adequate slack in the chains 46, so that the machine 12 will be supported by engagement of the tines 26 in the ground. The machine 12 is then pulled by the tractor 41 and the tines 26 by contact with the ground are revolved, together with the drum 23 in a clockwise direction as seen in Figure 1. As each row of tines moves downwardly the points 30 and leading edges 29 will penetrate the ground and as the machine is moving forwardly, the tines will be rocked in the ground for effectively loosening the soil adjacent each tine. Due to the fact that the tines taper in thickness toward their points 30, the earth between the tines will be displaced laterally while the tines are penetrating the earth for effectively loosening and breaking up the earth.

The extent that the tines 26 penetrate the ground will vary considerably depending upon how compact the ground is and also upon the weight of the machine. The machine is preferably of heavy construction and of sufficient weight to normally cause the tines to penetrate the ground throughout their entire length, for loosening the ground to a substantially greater depth than can be accomplished by other means. Additionally, the forward and rear frame ends 16, 18 and 17, 19 afford supporting means for bearing additional weight for further increasing the weight of the machine and the extent that it will penetrate the ground. Additionally, where the machine 12 is employed with a tractor having a drawbar 54 which is vertically adjustable, the rear end of the drawbar may be lowered so as to exert a downward and forward pull on the forward end of the frame 13 to additionally urge the frame downwardly to increase the extent of penetration of the tines 26. The elongated openings 63 are provided to accommodate a limited forward and rearward movement of the frame 13 relatively to the drawbar as said frame is raised and lowered, and to prevent the draft of the machine 12 from being borne by the beams 34 and brackets 55.

The machine is also well adapted for use in breaking up and smoothing lumpy ground, for example after plowing, by providing sufficient weight on the machine frame 13 so that the drum 23 will be in contact with the ground to act as a roller for smoothing and completing the crushing of lumps of earth which are broken up by the downwardly moving tines 26.

The tines 26 are formed of tempered steel having sufficient resiliency to enable the tines to flex to thus avoid breaking in striking hard obstructions such as stones. Due to this capacity of the tines to flex and further due to their tapering in width and thickness toward their pointed outer ends 30, the tines will be maintained clean at all times even when operated in wet soil and earth will not accumulate in the spaces between the tines.

Figure 9 illustrates a slightly modified form of the machine, designated generally 12a, which differs from the machine 12 in that the beams 34 and chains are omitted and in lieu thereof, a tongue 65 is fixed to the front frame part 16a and to the front brace 18a, midway between the side frame parts 14a and 15a. The tongue 65 extends forwardly from the front frame part 16a and has its forward portion braced by two diagonal braces 66 which are secured to and extend outwardly and rearwardly from opposite sides of the tongue 65. The remote ends of the braces 66 are secured to the front frame part 16a adjacent the ends thereof and contiguous with the brace elements 67 which extend between and are secured to the frame parts 16a and 18a. A pair of links 68 have rear ends disposed above and beneath the forward end of the tongue 65 and are swingably connected thereto by a pivot pin 69. The forward ends of the links 68 are disposed above and beneath the rear end of the tractor drawbar 54a and are swingably connected thereto by a coupling pin 70. The machine 12a, rearwardly of the front cross brace 18a, corresponds to the machine 12. The machine 12a is adapted for use with a tractor not equipped with a hydraulic lift. However, the drawbar 54a of most such tractors, not shown, is capable of vertical adjustment for tilting the machine frame 13a, so that by lowering the drawbar 54a, the draft will be downward and forward to cause the tines to penetrate the ground to a greater extent. Except for the lifting of the machine 12a to an inoperative transporting position and which cannot be accomplished, the operation of the machine 12a otherwise corresponds to the operation of the machine 12, as previously described.

Various modifications and changes in the embodiments of the invention as herein disclosed are contemplated and may obviously be resorted to, without departing from the spirit or scope of the invention as hereinafter defined by the appended claim.

I claim as my invention:

An earth loosening machine of the character described comprising a substantially rigid frame including spaced substantially parallel side members and a front portion extending between and rigidly secured to complementary ends of said side members, bearings secured to said side members in alignment with one another and spaced a substantial distance from said front portion, a drum having shaft portions projecting axially from the ends thereof and journalled in said bearings for rotatably supporting the drum therebetween, said drum extending downwardly from the frame and being adapted to engage the ground for supporting the frame in an elevated position, a plurality of tines fixed to and projecting outwardly from the periphery of said drum and adapted to penetrate the ground over which the drum is moving; a draft vehicle having a drawbar at the rear end thereof and hydraulic lift arms disposed for vertical swinging movement above said drawbar, a pair of laterally spaced beams secured to the underside of the forward portion of the frame and extending forwardly therefrom beneath a rear portion of the draft vehicle, said beams being disposed below the level of said drawbar, means connecting the forward ends of said beams to the draft vehicle for longitudinal sliding and vertical swinging movement of said beams relative to said draft vehicle, flexible means extending from said lift arms and connected to said beams between said frame and the draft vehicle for swingably raising and lowering the machine relative to the draft vehicle, and flexible draft means connected to the forward portion of the frame and to said drawbar, said flexible draft means being disposed above the level of said beams and extending upwardly and forwardly from said frame.

References Cited in the file of this patent

UNITED STATES PATENTS

| | | |
|---|---|---|
| 265,917 | Cochran | Oct. 10, 1882 |
| 1,045,250 | Blomberg | Nov. 26, 1912 |
| 1,230,194 | Mattson | June 19, 1917 |
| 1,606,300 | Hughes | Nov. 9, 1926 |
| 2,604,834 | Silver | July 29, 1952 |
| 2,667,112 | Carney | Jan. 26, 1954 |